United States Patent
Csurka et al.

(10) Patent No.: US 8,237,743 B2
(45) Date of Patent: Aug. 7, 2012

(54) MODIFICATION OF IMAGES FROM A USER'S ALBUM FOR SPOT-THE-DIFFERENCES

(75) Inventors: Gabriela Csurka, Crolles (FR); Guillaume M. Bouchard, Crolles (FR)

(73) Assignee: Xerox Corporation, Norwalk, CT (US)

( * ) Notice: Subject to any disclaimer, the term of this patent is extended or adjusted under 35 U.S.C. 154(b) by 638 days.

(21) Appl. No.: 12/372,063

(22) Filed: Feb. 17, 2009

(65) Prior Publication Data

US 2010/0210358 A1  Aug. 19, 2010

(51) Int. Cl.
G09G 5/00 (2006.01)
(52) U.S. Cl. ............................ 345/629; 345/619; 463/31
(58) Field of Classification Search .................. 345/619, 345/629; 463/31, 42
See application file for complete search history.

(56) References Cited

U.S. PATENT DOCUMENTS

| | | | |
|---|---|---|---|
| 5,667,438 A | 9/1997 | Rehm | |
| 7,384,718 B2 | 6/2008 | Wu et al. | |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0284791 A1 | 11/2008 | Bressan et al. | |
| 2008/0293495 A1* | 11/2008 | Okada ........................... | 463/42 |
| 2009/0237417 A1* | 9/2009 | Gadot ........................... | 345/629 |

FOREIGN PATENT DOCUMENTS

| GB | 2372218 A | * | 8/2002 |
|---|---|---|---|
| GB | 2395916 A | * | 6/2004 |

OTHER PUBLICATIONS

Flash Game Design "Make a Spot the Difference Game", www.flash-game-design.com/flash-tutorials/make-a-spot-the-difference-game.html, 2006-2011.*
U.S. Appl. No. 11/418,949, filed May 5, 2006, Perronnin.
U.S. Appl. No. 11/749,807, filed May 17, 2007, Bressan, et al.
U.S. Appl. No. 11/947,859, filed Nov. 30, 2007, Liu, et al.
U.S. Appl. No. 12/033,434, filed Feb. 19, 2008, Csurka, et al.
U.S. Appl. No. 12/045,807, filed Mar. 11, 2008, Perronnin.
U.S. Appl. No. 12/123,511, filed May 20, 2008, Marchesotti, et al.
U.S. Appl. No. 12/191,579, filed Aug. 14, 2008, Csurka, et al.
U.S. Appl. No. 12/199,392, filed Aug. 27, 2008, Mestha, et al.
U.S. Appl. No. 12/252,531, filed Oct. 16, 2008, Perronnin.
U.S. Appl. No. 12/361,235, filed Jan. 28, 2009, Perronnin, et al.
Agarwal, et al., A Local Basis Representation for Estimating Human Pose from Cluttered Images, *ACCV*, 2006.
Avidan, et al., Seam Carving for Content-Aware Image Resizing, *ACM Transactions on Graphics*, vol. 26, No. 3, SIGGRAPH (2007).
Bertalmio, et al., Image Inpainting, *Computer Graphics*, SIGGRAPH (2000).

(Continued)

*Primary Examiner* — Chante Harrison
(74) *Attorney, Agent, or Firm* — Fay Sharpe LLP

(57) ABSTRACT

A computer implemented system and method for generating a game, such as spot-the-difference are provided. The method includes receiving a user-selected original image and storing the image in memory. From the original image, the method includes automatically generating a pair of images which are visually identical except for a predetermined number of random localized modifications, and providing the pair of images to the user as a game which can be played by spotting differences between the pair of images as a result of the modifications.

23 Claims, 12 Drawing Sheets

OTHER PUBLICATIONS

Comaniciu, et al., Mean Shift: A Robust Approach Toward Feature Space Analysis, *IEEE Trans. Pattern Anal. Machine Intell.*, 24, 603-619 (2002).

Criminisi, et al., Region Filling and Object Removal by Exemplar-Based Image Inpainting, *IEEE Transactions on Image Processing*, vol. 13, No. 9, Sep. 2004.

Csurka, Visual Categorization with Bags of Keypoints, *ECCV Workshop on Statistical Learning in Computer Vision*, 2004.

Cutzu, et al., Estimating the Photorealism of Images: Distinguishing Paintings from Photographs, *CVPR*, 2003.

Drori, et al., Fragment-Based Image Completion. *ACM Transactions on Graphics*, 22, 3, 303-312. 1, 4 (2003).

Faridy, et al., High-Order Wavelet Statistics and Their Application to Digital Forensics, *IEEE Workshop on Statistical Analysis in Computer Vision (In conjunction with CVPR)*, 2003.

Farrugia, et al., A Perceptual Adaptive Image Metric for Computer Graphics, *WSCG*, 2004.

Hays, et al., Scene Completion Using Millions of Photographs, *SIGRAPH*, 2007.

Lalonde, et al., Photo Clip Art, *SIGRAPH*, 2007.

Lalonde, et al., Using Color Compatibility for Assessing Image Realism, *IEEE Intl. Conf. on Computer Vision*, 2007.

Larlus, et al., Category Level Object Segmentation—Learning to Segment Objects with Latent Aspect Models, *VISAPP*, (2) 2007.

Perronnin, et al., Fisher Kernels on Visual Vocabularies for Image Categorization, *CVPR*, 2007.

Shi, et al., Normalized Cuts and Image Segmentation, *IEEE Trans. Pattern Anal. Machine Intell.*, vol. 22, No. 8, 2000.

Weiss, et al., What Makes a Good Model of Natural Images?, *CVPR*, 2007.

www.brb.org.uk/, downloaded Nov. 11, 2008.

\* cited by examiner

MODIFICATION OF IMAGES FROM A USER'S ALBUM FOR SPOT-THE-DIFFERENCES

CROSS REFERENCE TO RELATED PATENTS AND APPLICATIONS

The following copending applications, the disclosures of which are incorporated in their entireties by reference, are mentioned:

U.S. application Ser. No. 12/033,434, filed Feb. 19, 2008, entitled CONTEXT-DEPENDENT INTELLIGENT THUMBNAIL IMAGES, by Gabriela Csurka, et al.

U.S. application Ser. No. 12/123,511, filed May 20, 2008, entitled IMAGE VISUALIZATION THROUGH CONTENT-BASED INSETS, by Luca Marchesotti, et al.

U.S. application Ser. No. 12/191,579, filed Aug. 14, 2008, entitled SYSTEM AND METHOD FOR OBJECT CLASS LOCALIZATION AND SEMANTIC CLASS BASED IMAGE SEGMENTATION, by Gabrieia Csurka, et al.

U.S. application Ser. No. 11/947,859, filed Nov. 30, 2007, entitled OBJECT COMPARISON, RETRIEVAL, AND CATEGORIZATION METHODS AND APPARATUSES, by Y. Liu and F. Perronnin.

U.S. application Ser. No. 12/199,392, filed Aug. 27, 2008, entitled IMAGE INDEXED RENDERING OF IMAGES FOR TUNING IMAGES FROM SINGLE OR MULTIPLE PRINT ENGINES, by L. K. Mestha, et al.

U.S. application Ser. No. 12/045,807, filed Mar. 11, 2008, entitled COLOR TRANSFER BETWEEN IMAGES THROUGH COLOR PALETTE ADAPTATION," by Florent Perronnin.

BACKGROUND

The exemplary embodiment relates to the image processing arts. It finds particular application in the context of a computer implemented system and method for providing a pair of otherwise identical images in which a selected number of visually detectable differences have been automatically introduced. The differences may be of the type suited to playing a Spot-the-Differences game or similar spotting game.

The pencil and paper Spot-the-Difference game is a classic and popular recreation for both children and adults. The basic idea is simple: given two similar pictures, the player is asked to find the differences that have been voluntarily introduced by the artist/designer. Traditionally, the images were hand drawn, but recently, photographic images have been used. Such games are now made available by online game sites.

With the growing use of digital cameras by non-experts, a large number of images are being generated by users who may be interested in having a personalized spot-the-difference game based on their own pictures. However, modification of images to provide a pair of images in which the differences are detectable but not immediately obvious is a relatively complex and manually intensive process. For example, to generate K differences, K regions of the image are selected and for each one, a manual modification is made, often with some digital image retouching. K is often equal to 7 so that the game is known under the name "the seven differences" in France.

The exemplary embodiment provides an automated or semi-automated system and process for generating spot the difference image pairs which overcome the above problems, and others.

INCORPORATION BY REFERENCE

The following references, the disclosures of which are incorporated in their entireties by reference, are mentioned:

U.S. Pub. No. 2007/0005356, entitled GENERIC VISUAL CATEGORIZATION METHOD AND SYSTEM; U.S. Pub. No. 2007/0258648, entitled GENERIC VISUAL CLASSIFICATION WITH GRADIENT COMPONENTS-BASED DIMENSIONALITY ENHANCEMENT; and U.S. Pub. No. 2008/0069456 entitled BAGS OF VISUAL CONTEXT-DEPENDENT WORDS FOR GENERIC VISUAL CATEGORIZATION, all by Florent Perronnin; and G. Csurka, C. Dance, L. Fan, J. Willamowski and C. Bray, "Visual Categorization with Bags of Keypoints", ECCV workshop on Statistical Learning in Computer Vision, 2004, disclose systems and methods for categorizing images based on content.

U.S. Pub. No. 2008/0284791, published Nov. 20, 2008, entitled FORMING COLORING BOOKS FROM DIGITAL IMAGES, by Marco Bressan and Gabriela Csurka, discloses a method for automatically generating a coloring book image that includes line drawings defining a small number of color-coherent, clearly discriminated, closed regions while preserving the basic semantic properties of an original image, such as a photograph.

U.S. Pat. No. 5,667,438, issued Sep. 16, 1997, entitled METHOD OF CONSTRUCTING CROSSWORD PUZZLES BY COMPUTER, by Peter Rehm, discloses a software crossword puzzle design tool which provides a menu-driven user interface with various editing functions allowing the user to specify details of the crossword puzzle desired, such as the size, pattern, and inclusion of certain theme words. The unsolved puzzle is constructed automatically by a computer assigning letters to cells one cell at a time. Clues can be assigned to the puzzle automatically or manually, and then the unsolved puzzle can be printed.

BRIEF DESCRIPTION

In accordance with one aspect of the exemplary embodiment, a computer implemented method of generating a game includes receiving a user-selected original image, storing the image in memory, and from the original image, automatically generating a pair of images which are visually identical except for a predetermined number of random localized modifications, and providing the pair of images to the user as a game. The game can be played by spotting differences between the pair of images as a result of the modifications.

In accordance with another aspect of the exemplary embodiment, a system for generating a game includes an image modification component stored in memory comprising instructions which prompt a user to select an original image from an album of the user and, from the original image, automatically generates a pair of images which are otherwise identical except for a predetermined number of localized modifications, the game being played by spotting differences between the pair of images. A processor, communicatively linked to the memory, executes the instructions and outputs the pair of images to the user as a game.

In another aspect, a method of playing a game includes providing for a user to select an original image from the user's album. From the original image, a pair of images is automatically generated. The images are visually identical except for a predetermined number of localized modifications. The method further includes outputting the pair of images and playing a game with the pair of images by spotting differences between the pair of images.

DETAILED DESCRIPTION

Figure 1:
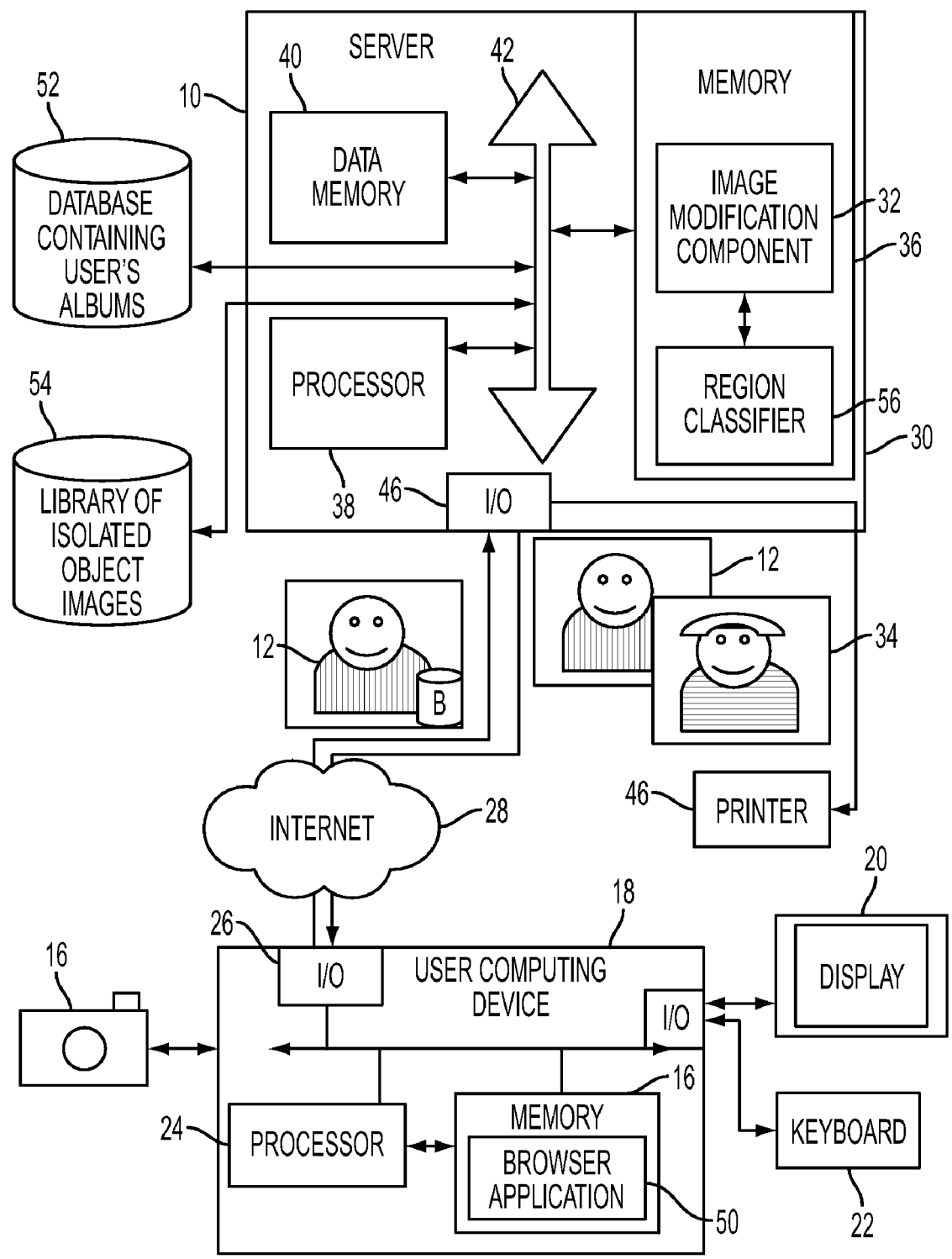
FIG. 1 is a functional block diagram of a system for modifying customer images for generating a spot the difference game.

With reference to FIG. 1, an environment in which a computer-implemented system 10 for automatically modifying a customer image for use in a game, such as SPOT-THE-DIFFERENCE is illustrated. System 10 may be used in performing the exemplary method described below, with reference to FIG. 2.

Images 12 to be modified may be received by the system 10 in any convenient file format, such as JPEG, TIFF, or the like. While the photographic digital images shown in the accompanying FIGURES are represented by line drawings, it is to be appreciated that these are for illustrative purposes only. Images may be individual images or video images. In general, each input digital image includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single color channel, however expressed (RGB, YCbCr, etc.). Typically, the images are photographs of natural objects, such as people, urban scenes (including vehicles, buildings etc.), landscapes, seascapes, flowers, combinations thereof, and the like, although scanned images are also contemplated.

A customer may acquire digital images, such as image 12, using an image acquisition device 14, such as a digital camera, camera-equipped mobile phone, scanner, or the like and store the digital images in data memory 16 on the users computing device 18, such as a laptop, personal computer, memory storage device, PDA or the like. A display 20, such as an LCD screen, is communicatively linked to the computing device 18 for displaying customer images for selection and for displaying images modified by the system 10. Using a user input device 22, such as a keyboard, cursor control device, touch screen, or the like, a user selects one or more of the stored images 12 to be modified for use in a game.

The exemplary computing device 18 also includes a processor 24, such as a CPU and an input output device 26, such as a modem, for communicating with system 10 via a wired or wireless link 28, such as the Internet or a local or wide area network. Selected images can thus be sent to the system 10 for processing.

The exemplary system 10 may be hosted by one or more computing devices. In the illustrated embodiment, the system 10 is hosted by a server computer 30, although it is also completed that the system may be hosted by the user's device 18. The system 10 may be embodied in hardware, software, or a combination thereof. The exemplary system 10 includes an image modification component 32, which receives a digital image 12 to be modified and outputs a pair of images including the (optionally enhanced) original image 12 and modified digital image 34. The output image 12 and modified image 34 are visually identical (i.e., to the naked eye) except for a predetermined number k of modifications.

In the exemplary embodiment, the image modification component 32 is in the form of software instructions stored in main memory 36 of the server computer 30 which are executed by an associated processor 38, such as a CPU. While being processed, the image 12 may be stored in data memory 40. Components of the server computer 30 may communicate via a data/control bus 42. The server computer 30 includes one or more input/output devices 44 which allow communication between the server computer and user device 18 and optionally with an image output device, such as a printer 46.

Figure 3:
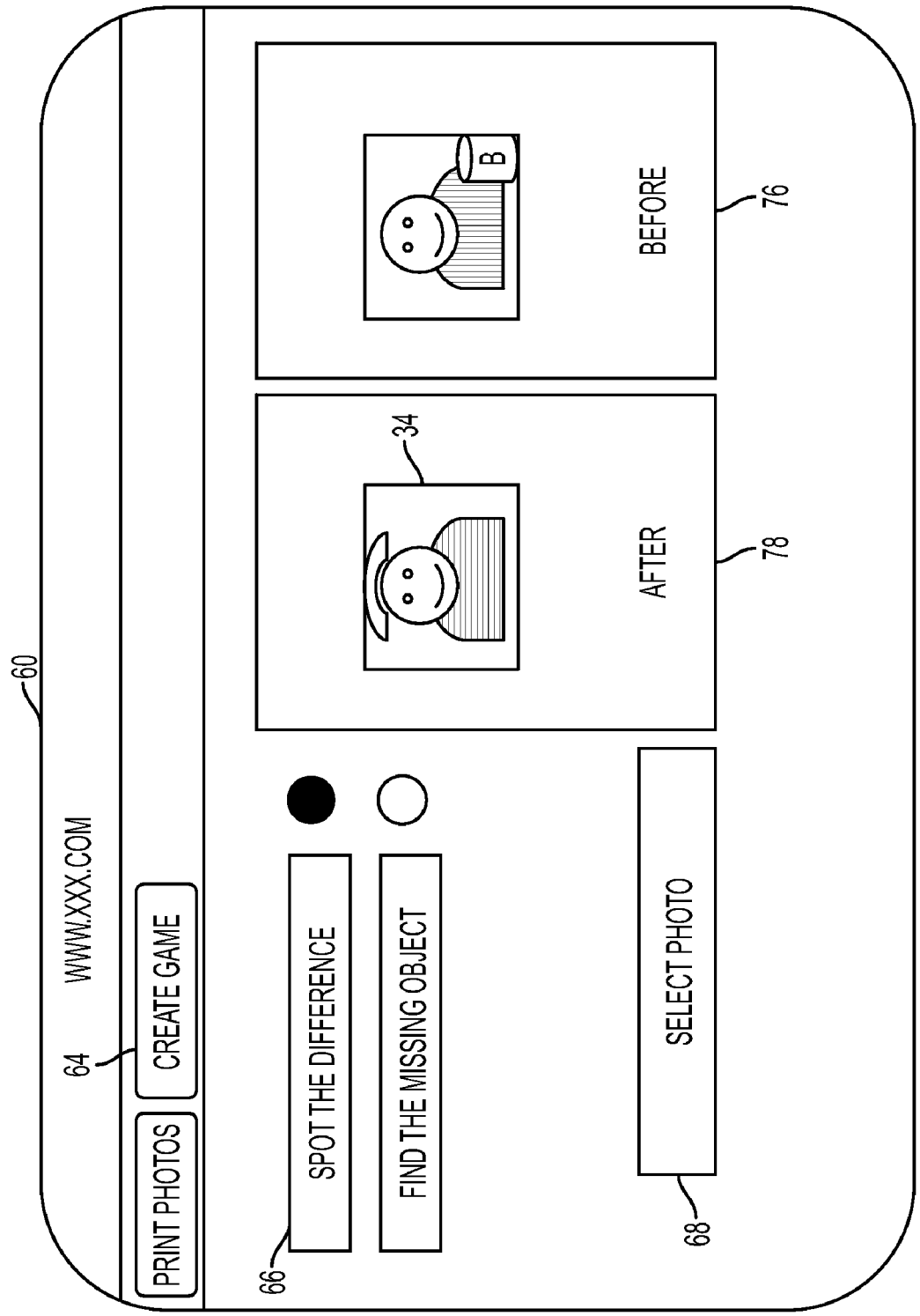
FIG. 3 is a screenshot of an exemplary web browser application.

The user's computer 18 may include a browser application 50 allowing the user to access the public site of a photofinishing service through a web browser displayed on the user's display 20 (as illustrated, for example, in the screenshot 60 of FIG. 3). The image 12 to be modified may be selected by the user from the user's digital photo album (which may be stored in memory 16 or separate memory on the computer device 18), uploaded to the server 30 using the web browser 50, and stored in data memory 40 during processing. Alternatively, the image 12 may be selected from a database 52 containing the user's previously uploaded photo album(s). The database 52 may be stored in memory 40 on the server 30 or in a memory storage device communicatively linked to the server 30.

Prior to processing with the image modification component 32, the image 12 may be pre-processed with an automated image enhancement tool to improve color balance, brightness, or the like and may undergo other modifications, such as size modification, cropping, or the like, some of which may be performed under the user's supervision and control.

The image modification component 32 determines the modifications to be made, based on the original input image, to create a modified image which is identical to the original image except for a selected number of detectable modifications. In general, the modifications are local, rather than global, and each modification may be applied to a separate region of the image. The image modification component 32 may be implemented in hardware or software, for example, as a plug-in application for an interactive photo-editing system or in a standard photographic print workflow. The modification component 32 may have access to a large library 54 of isolated images of objects suitable for insertion, which may be indexed according to a class or classes of image region(s) with which the object is compatible. The modification component 32 may include or have access to a classification component 56 which assigns classes to each of a plurality of regions of the input image.

Figure 2:
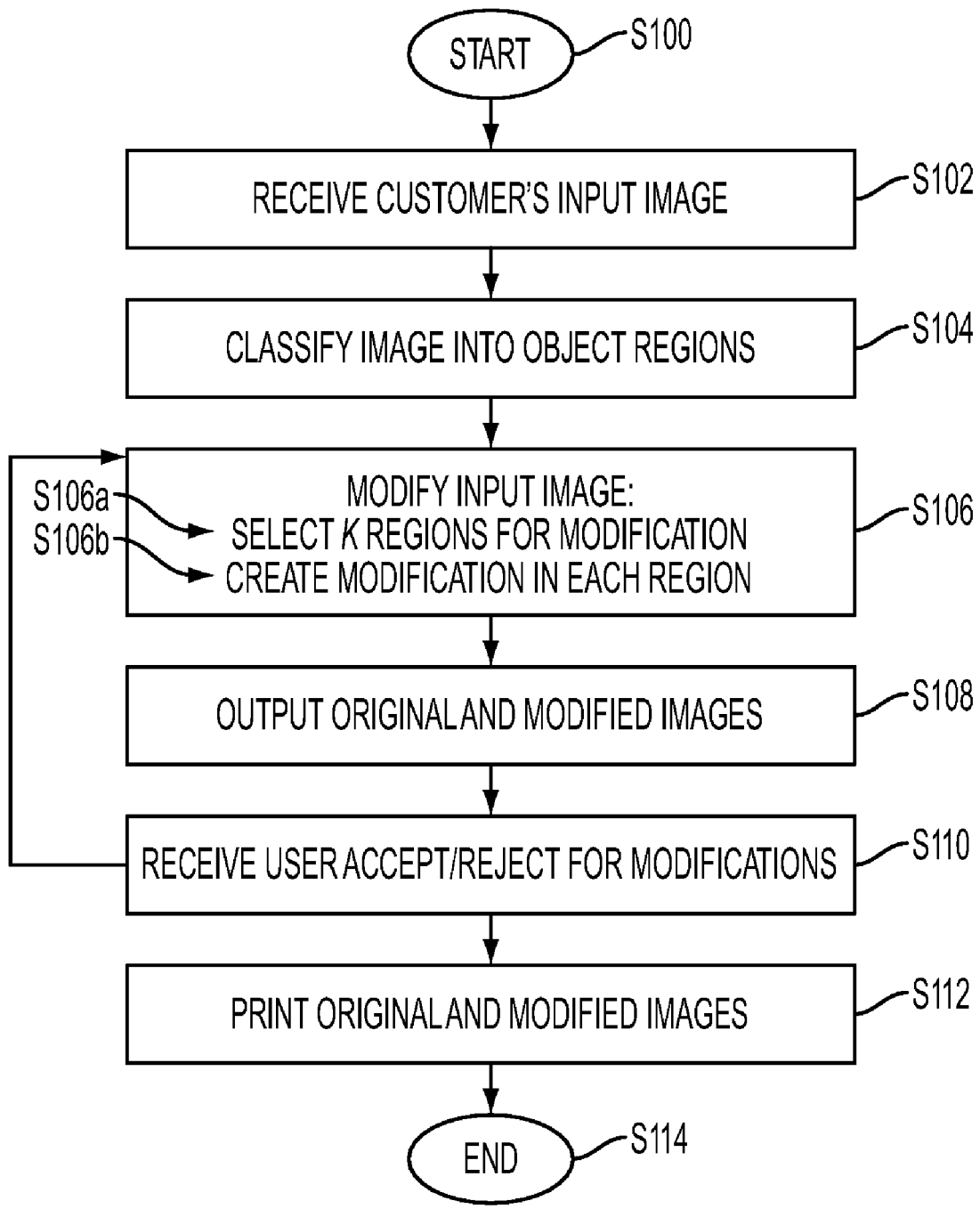
FIG. 2 is a flowchart illustrating an exemplary method for modifying customer images for generating a spot the difference game.

With reference to FIG. 2, an exemplary method for automatically (or semi-automatically) generating images for playing spot-the-difference and/or other activities from a photo album, such as find the hidden object, find the correct missing part, and the like. The exemplary method may be performed with the computer implemented system 10 of FIG. 1.

The method begins at S100.

At S102 an image 12 to be modified is input to the system 10. For example, using the web browser, a user actuates the "create a game" function by clicking on an active area of the screen 64 (FIG. 3). The user may select the type of game from a list 66 or drop down menu. The user uses a drag-and-drop function 68 or other method for selecting an image 12 to be part of the game. The user may also be prompted to select a difficulty level, such as one of "easy" (for very young children), "advanced" (for older children) and "challenging" (for adults and experienced players), with the option of selecting a mixture of difficulties when multiple customer images are being used.

Figure 4A:
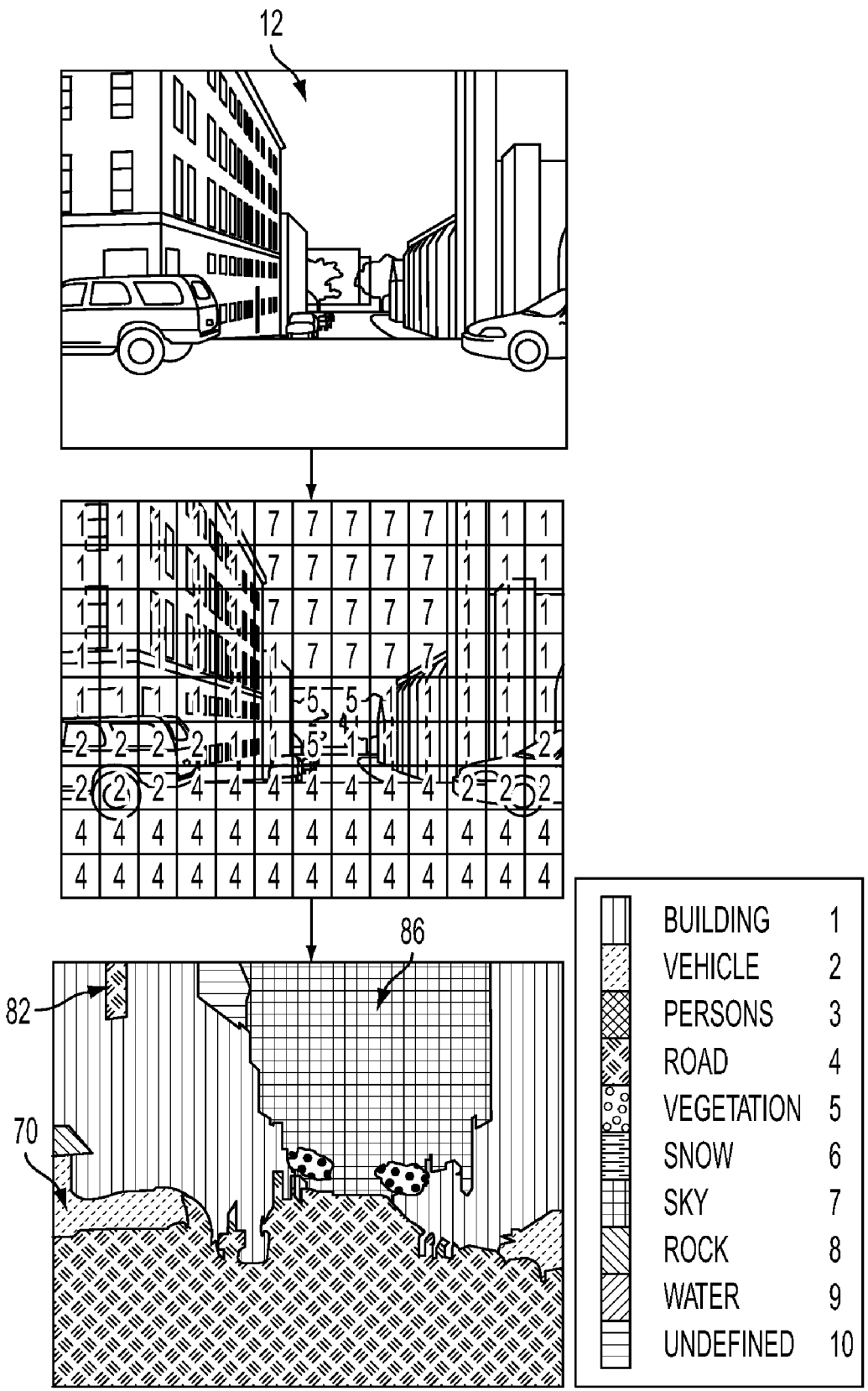
FIG. 4 graphically illustrates modifications to an exemplary image.
Figure 4B:
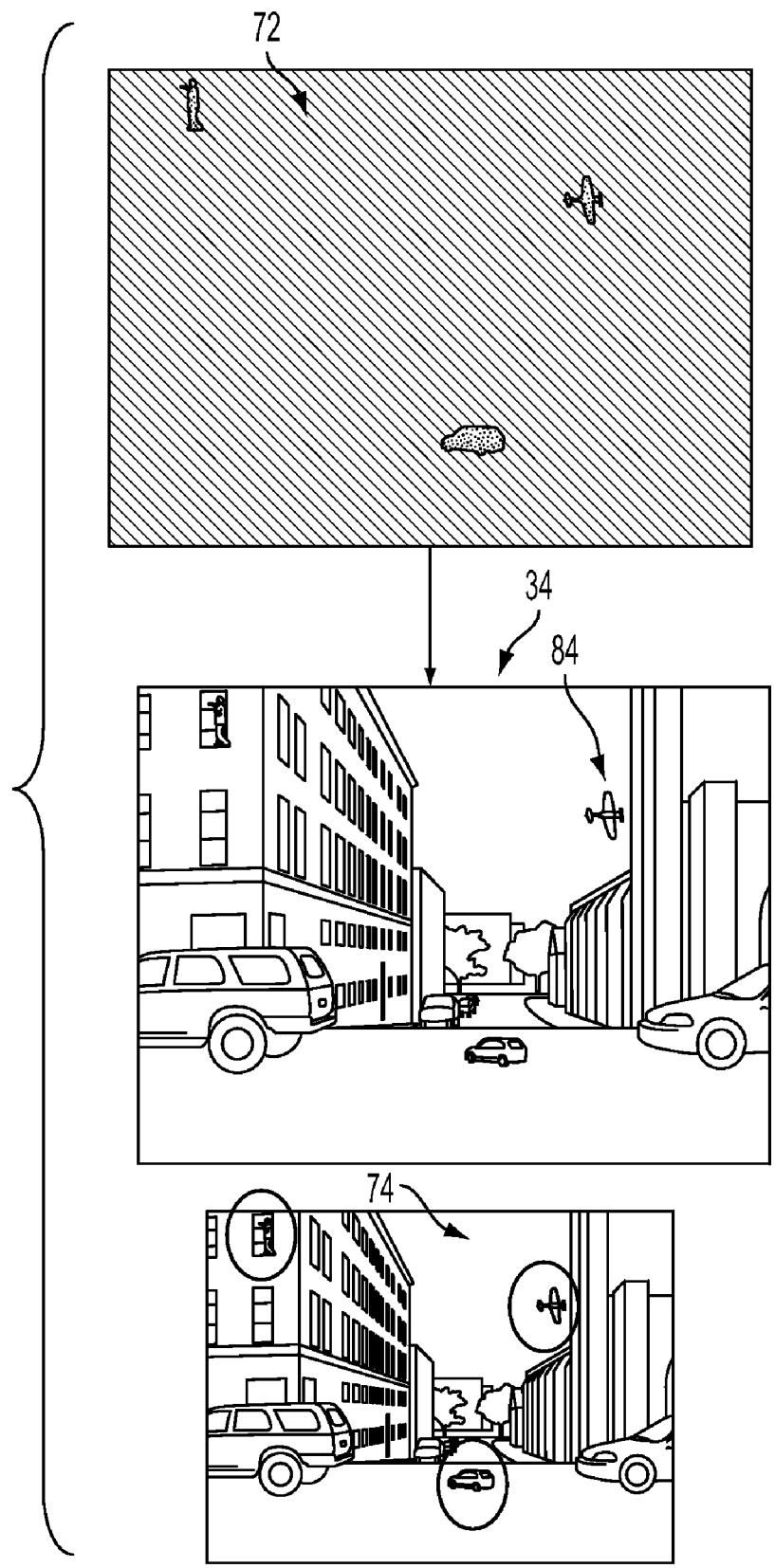

At S104, regions/objects in the image are classified/identified into a most probable one of a set of object classes. For example, regions of the image (which meet at least a threshold size) are assigned to one of a set of object classes, such as Buildings, Persons, Rock, Sand, Sky, Snow, UrbanStructure (roads), Vegetation, Vehicles, Water, and an Undefined class for objects/regions which could not be otherwise labeled. FIG. 4, shows an exemplary image map 70 where regions assigned to different categories are shown in different shading, for ease of illustration. Objects in the image may be localized by the method of U.S. application Ser. No. 12/191,579 or by determining edges or by using specific using tools, such as face recognition tools or the like.

At S106, a selected number k of modifications is automatically applied to the image to generate a pair of images which are identical other than with respect to the k modifications. The modifications are localized in the sense that they are not global modifications and are not overlapping to any significant extent which would prevent the modifications from being visually distinguishable. In general, k is at least one and can be, for example, from three to ten. The level of difficulty of the game(s) can be easily tuned by the type of modifications introduced. Exemplary types of modification may include some or all of the following: a) deletion of an object or part of an object; b) addition of an object; c) replacement of an object with a different object, changing the color of an object, combinations thereof, etc. A pair of images may include more than one type of modification. In one embodiment, all of the k modifications are made to the second image 34, such that the first image 12 of the pair is unmodified. The locations of the modifications may be stored as a mask 72 (FIG. 4).

At S108 the pair of images 12, 34 comprising the (optionally enhanced) original image and the modified image is output. Optionally, a further image 74 (FIG. 4), identifying the locations of the modifications is also output, so a user playing the game can verify that he has identified all the modifications correctly.

At S110, the images 12, 34 are optionally presented to the user, e.g., via the display 20, for a user to review and accept the modifications. For example, the web browser may show a side by side before and after views 76, 78.

In one embodiment, the pair of images 12, 34 is output to the printer 46 and at S112 is printed. The printed pairs of images may then be shipped to the user, in the case of a web-based service.

The method ends at S114.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the exemplary method.

Further details of the system and method will now be described.

As noted above, the image 12 may be input to the system 10 at S102 in any suitable manner from any suitable medium capable of storing and/or delivering images. By way of example, FIG. 3 shows an exemplary web browser-generated screenshot 60 displayed on the on the user's display device 20, which allows a user to select the spot the difference option through an active area of the screen at 62 and select one or more images 12 from the user's album located in memory 16 or database 52, which is to be used.

At S104, the image may be processed to identify regions and/or objects in the image, e.g., according to the method outlined in above-mentioned U.S. application Ser. No. 12/191,579, incorporated by reference. In the automated method disclosed therein, patches of an input image are extracted, e.g., on a grid at one or more scales. For each patch, at least one high level feature is extracted based on its low level representation and a generative model built from the low level features. For each patch, a relevance score is computed for one or more object classes. An object class label can then be assigned to each of the pixels of the image, based on the computed relevance score(s) for the patches in which the pixel resides. Contiguous regions of the image with the same class labeled can thus be labeled as different regions. Exemplary class labels include building, sky, landscape, seascape, vehicle, etc. Each region may comprise one or more objects. In other embodiments, S104 may include low level segmentation (LLS) of the image into a large number of segments where the pixels are similar in color. All the pixels in a segment are assigned an object class probability or class label which is representative of the segment. Larger objects/regions are then identified, based on class probability maps for the entire image, which are built from the pixel class probabilities.

At S106, the exemplary method automatically selects k regions of the image 12 as the locations for the image modifications, without the need for user input. Step 106 may include 2 substeps, S106a, selection of regions and S106b, modification of selected regions.

Starting from a given image I, the goal of the system is to find a transformation T so that the pair (I, T(I)) is a pair of Spot-the-Difference images, meaning that I and T(I) are dissimilar only with respect to a set of K local regions of the image. Let the transformation $T=T_1°T_2° \ldots °T_K$ be a composition of K local transformations $T_1, T_2, \ldots, T_K$.

Two methods of selecting the regions are proposed by way of example: 1) a sequential introduction of the local transformations; and 2) a global optimization strategy based on the best choice of K local transformations among M>K possible local transformations. Both of these systems make use, as an inner loop, the generation of a (in general, random) local transformation. However, other methods for selection of modification locations are also contemplated.

In both the sequential and global embodiments, the exemplary system and method may be fully automated, i.e., the system 10 takes as input an image and outputs a pair of spot-the-difference images.

a) Sequential Method of Introducing Modifications

In a first method, a region selection algorithm is applied which is based on the sequential introduction of the modifications, whereby after each modification has been made, the modified region is taken into account in selecting the next region. In this way, two modifications are not in the same location such that one modification does not obscure the other. Regions selected for modification can be, for example, the low level segments or larger regions/objects identified in S104, depending on the type of modification selected. In the sequential method, S106 includes recursively applying a random modification to the input image (here, "random" simply means that a user is not able to predict where the modifications will be made, not that the selection of the region is necessarily entirely random). At each step, a dilated version of the modified region (encompassing the modified region and optionally also a strip of a few pixels in width around its perimeter) is eliminated (e.g., masked) in order to avoid intersections and/or touching of the modified regions (as shown, for example in the Modifications Memory Map (MMM) in FIG. 5).

An exemplary Algorithm for Introducing Sequential Transformations is as follows:

1) initialize $J_0 = I$,
2) for $k=1, \ldots, K$,
   a) choose a random local transformation $T_k$
      i) Check that its support does not overlap with the previous local transformations $T_1, T_2, \ldots, T_{k-1}$, which can be handled by a simple modification mask.
      ii) Optionally check if it has a good quality score (see below for exemplary quality measures),
   b) Apply the transformation $J_k = T_k(J_{k-1})$ and add a dilated version of the modified region to the modification map.

As each new transformation is made, its mask is added to a Modifications Memory Map (MMM), which simply shows the masked regions of the image. For example, in the process shown in FIG. 5, the system first selects to add an object 80 (a person) to a region 82 (FIG. 4) which has been classed (incorrectly in this prototype) as road. The region occupied by the person 80 is then masked in the MMM 72. The system next adds another object 84 (an airplane) to a region 86 classed as sky. In the third modification, a vehicle object is added to a region classed as road, and so forth. In the verification stage, the user may opt to adjust the scale of this object, or its location, to match the perspective of the other objects in the image.

b) Global Method of Introducing Modifications

A second method utilizes a region selection algorithm which is based on the selection of a set of complementary modifications from a large pool of possible modifications. Once again, selection is random in the sense that the user cannot predict or know in advance what modifications will be made. In this method, the system automatically outputs a couple of spot-the-difference images based on an input image by generating a large number of random modifications to the input image, and choosing a combination of these modifications that maximizes one or more given acceptability criteria.

A two-step process may be used as follows:
1. Generate a large number of random local transformations $T_1, T_2, \ldots, T_M$ where M is bigger than K,
2. Find the best subset of indices $\sigma_1, \sigma_2, \ldots, \sigma_K$ that maximizes a given criteria $q(I, T\sigma(I))$, where $T\sigma(I) = T\sigma_1 \circ T\sigma_2 \circ \ldots \circ T\sigma_K(I)$ under the game constraints.

The local transformations may be selected as follows:

a. They Obey the Constraints of the Game

The main constraint of the game is that the number of visible local modifications is exactly K, meaning that no two transformations are applied to the same area of the image (otherwise the player would perceive only one modification). One problem with the global optimization approach is that it does not guarantee a priori that the local transformations are not applied to the same object. This can be prevented by applying a constraint which prevents two modifications from occurring in the same region. Let nmo(I,J) denote the number of modified objects/regions in J relative to I. The constraint can be expressed in the form nmo(I,J)=K. In its simplest form, nmo(I,J) could be the number of correct connected components in |I−J|, i.e. the number of distinct regions in the difference of the images. However this function, although simple, has the drawbacks that it penalizes modification of neighbor regions or miscounts the modifications of non-connected objects. One solution is to use a more complex function that takes into account, for example, the class labels of the regions. However, since the object of the method is not to find the best possible solution, but only to ensure elimination of the non-conforming ones from a big subset, the elimination of some transformations that would in practice be acceptable is not a problem.

b. They Satisfy a Quality-Based Score

This criterion can be optional. Or, it can be simplified, for example for the youngest users. The method allows criteria to be defined that allow the selection of a pair of images that comply with one or more predefined user preferences. It is to be appreciated that preferences may vary from user to user. Compliance can be modeled by a quality function q which associates a score (e.g., a scalar value) to every pair of images (I,J). The score q(I,J) may be a function of several components, some of which may be learnt from user feedback, or from measures of the "degree of photorealism", and the visual difficulty to distinguish pairs on images. Some of the possible criteria from simple to more complex could be:

1. Favoring the similarity or the dissimilarity between images. A distance measure $\|I-J\|$ can be defined. This can be the Euclidian distance or Mahalanobis distance applied to the pixels, or on any transformation of the images, peak signal to noise ratio (PSNR), or other designed measures to evaluate the perceptual distortion of an image modification. Or, a more complex representation of the images can be used (Fourier or wavelike transform, Bag of word representation, Fisher Kernel on a probabilistic models, etc.) to measure this similarity. The following references, the disclosures of which are incorporated by reference in their entireties provide exemplary methods for measuring similarity between images: U.S. application Ser. No. 12/252,531, filed Oct. 16, 2008, entitled MODELING IMAGES AS MIXTURES OF IMAGE MODELS, by Florent Perronnin; U.S. application Ser. No. 11/947,859, filed Nov. 30, 2007, entitled OBJECT COMPARISON, RETRIEVAL, AND CATEGORIZATION METHODS AND APPARATUSES, by Y. Liu and F. Perronnin; U.S. application Ser. No. 12/361,235, filed Jan. 28, 2009, entitled MODELING IMAGES AS SETS OF WEIGHTED FEATURES, by Florent Perronnin, et al.

In this way the system can favor a high similarity and augment the difficulty level of the spotting or favor a high dissimilarity, leading to easier spotting. For this, it is assumed that in the selection phase, very small (unnoticeable) regions are excluded from modifications and big regions are split into sub-parts.

2. Favoring the photorealism P(J) of the transformed image. Methods have been developed for measuring the probability that an image appears natural (see, for example, Yair Weiss and William T. Freeman. What makes a good model of natural images? CVPR (2007)).

3. Favoring the modifications which have been well rated (accepted) in previous user tests when applied to similar images. In this case it is assumed that there is a sample (($I_1,J_1$), ($I_2,J_2$), ..., ($I_n,J_n$)) of n image pairs, previously labeled with corresponding user rankings ($r_1, r_2, \ldots r_n$). The score function defined by U(I,J) can be learned using a regression method, such as linear regression, Kernel regression, neural networks, or the like. The most similar images are selected and the modifications that are similar to those applied in the selected image pairs are favored. For this criterion, a measure of similarities between the modifications is defined, which can be a function of their type, the similarity between the selected regions, the strength of the modifications, etc.

If several criteria are to be applied simultaneously, they can be optimized as a weighted combination, where the weights allow the tuning/compromise between the "degree of photorealism" and the level of spotting difficulty.

For example the scoring may be $$q(I,J)=U(I,J)+\alpha P(J)+\beta\|I-J\|^2$$

where $\alpha$ and $\beta$ are weights which can be tuned to provide a compromise between the degree of photorealism and the level of spotting difficulty.

The proposed method is unsupervised, i.e., it is not based on a set of gold-standard spot-the-difference pairs. However, some parameters can be chosen, which may be performed automatically using supervised machine learning techniques where the goal is to choose the parameters that lead to a final spot-the-difference pair that is acceptable to a reference user.

It will be appreciated that satisfying the above criteria is typically not a true measure of performance or validity of a pair of images. Rather, since the aim is to produce a game where users are able to spot the differences, but not too easily, the true test is whether the players rate the game as enjoyable or not.

Semi-Automated Systems (S110)

In semi-automated embodiments, a user may be permitted to view the modifications and accept or decline them. In the sequential method, the modifications may be presented to the user sequentially, as they are generated, or as a group. When presented sequentially, the user validates the modification before the system generates the next modification. If the user rejects the modification, the system removes it and proposes a new one.

The system may be interactive in that it allows the user to interactively adjust the automatically generated modifications, e.g., by changing the scale, location, or other parameters of the proposed modification, which are then validated by the user. In the case of image insertion, the user can modify the scale, orientation and blending factor. In the case of color segment modification, the user can modify the contrast, luminosity or gamma value of the selected fragment. He can also modify (extend, move or reduce) the shape of the selected region. He can further select an object for deletion. Techniques which may be used include those described by S. Avidan, A. Shamir, Seam Carving for Content-Aware Image Resizing, ACM Transactions on Graphics, Volume 26, Number 3, SIGGRAPH 2007 ("Avidan"); M. Bertalmio, G. Sapiro, V. Caselles and C. Ballester, Image Inpainting, Computer Graphics, SIGGRAPH 2000 ("Bertalmio"); A. Criminisi, P. Perez, and K. Toyama, Region Filling and Object Removal by Exemplar-Based Image Inpainting, IEEE Transactions on Image Processing, Vol. 13, No. 9, September 2004 ("Criminisi").

This type of interaction may be very interesting in a real application, as it enables the user to actively participate in the creation of the spot-the-difference pair, while maintaining a significant speedup in the process, compared to the manual introduction of the changes.

Generating the Local Transformations (S106b)

A local transformation can be uniquely defined by the triplet (t,R,$\theta$) where t is the type of transformation, R is the mask of the region that is modified by the transformation and $\theta \in \Theta_t$ is a parameter set that depends on the type of transformation (e.g., an angle in the case of rotation, a 2D vector in the case of translation). The following are examples of modifications that may be automatically applied, singly or in combination:

1. Rigid/geometric transformation (rotation, translation, scaling, stretching, distortion), 2. Non-rigid transformation e.g., modification to a human posture, such as leg positions. This requires being able to classify portions of objects with reasonable accuracy and to apply an appropriate transformation for that object. Techniques such as those described in A. Agarwal and B. Triggs, A local basis representation for estimating human pose from cluttered images, ACCV 2006, can be used to estimate the human pose and using human body animation to change the pose and accordingly the image.

3. Addition of an object. For example a database of isolated objects may be accessed and an object compatible with the class of the selected region selected. For example, airplane would be compatible with parts of the image classed as sky, person or vehicle objects would be compatible with road regions in the image, and so forth. The objects may be indexed in the library according to the region classes with which they are compatible. Some objects may be compatible with more than one class of region, others with only one. Objects may be selected entirely at random. In other embodiments, the object is checked to make sure that has some or all of a set of desired properties, such as camera pose, orientation, lighting, etc. See, for example, Jean-François Lalonde, et al., Photo Clip Art, SIGRAPH 2007.

4. Photorealist insertion Photorealist insertion is a particular type of addition of an object where the insertion is done in a way to insure photo realism. For example, a hand is inserted in a picture of people, which is compatible with the object classes identified for the image (see, for example, I. Drori, D. Cohen-Or, H. Yeshurun, Fragment-based image completion. ACM Transactions on Graphics 22, 3, 303-312. 1, 4 (2003)).

5. Deletion of an object (e.g., removal of people or buildings). Methods which may be used to remove an object or a selected region may be based on techniques developed in the inpainting field, and are disclosed, for example, in the Avidan and Bertalmio articles previously mentioned and I. Drori, D. Cohen-Or, H. Yeshurun, Fragment-based image completion, ACM Transactions on Graphics 22, 3, 303-312. 1, 4 (2003). In Bertalmio, the inpainting technique is based on smoothly propagation of the surrounding areas information in the isophotes direction. They propagate not only texture, but also structure information using a block-based sampling process. The approach in Drori is an iterative approach which completes the removed region by adaptive image fragments, where the fragments are selected from the image based on their similarity and frequency. In Avidan, the object removal is done by repeatedly carving out seams.

Unlike the techniques disclosed in these references, the goal for the present application is different. For example, techniques developed for elimination of undesired regions or scratches, errors in the original image can be used on a larger scale. In the present case, rather than looking for undesired regions, the region(s) to be modified are selected randomly or an object given some size constraints, such as being inside another region (this may increase the quality of the inpainting). Additionally, the system 10 can search for given object classes, such as car, person, glass, using a Class Based Segmented image, as disclosed, for example, in above-mentioned U.S. application Ser. No. 12/191,579.

6. Object appearance change (e.g., changing the color of a ball). By appearance change, it is meant not only a color change, but also an increase or decrease in the saturation, making an object lighter or darker (e.g., by modifying locally the object's exposure), changing its contrast according to the neighbor regions or even changing the texture of an object from a texture database. Such techniques can be implemented through use of the Xerox AIE (Automated Image Enhancement) system, which is normally applied to the whole image rather than locally. The main differences in this application are that the transformation is not based on a determination that the image will be enhanced by applying the transformation and applying it only to a given region. For example, a region's color ca be changed making it more bluish (adding blue), reddish (adding red), yellowish, etc. The texture change of an object can be done either by selecting a similar texture in the image or by using a texture database and filling the region with the selected texture.

These methods can be used singly or in combination. For example, the system provides a set of individual local transformations, that can take advantage of different method of creating the transformations and combine them to propose an automatically (or semi-automatically) created spot-the-difference image pair.

7. Object replacement: The system can select an object or a region and find a replacement object in a large database of photographs that contain similarly shaped and/or sized image regions. Such techniques are described in James Hays and Alexei A. Efros, Scene Completion Using Millions of Photographs, SIGRAPH 2007.

Without intending to limit the scope of the exemplary embodiment, the follow example describes a prototype system for establishing that the method is workable.

EXAMPLE

A prototype system was implemented in MATLAB with a small object database containing only 20 objects. As will be appreciated, an operational system may include at least 100, e.g., many hundreds of objects. The examples focus on randomly selecting 3 objects for addition and after that, 3 regions for local color manipulation. These modifications were introduced sequentially, although it is to be appreciated that the different types of modification can be introduced in a random fashion.

As a first step, the target image to be modified is segmented in low level segments (LLS) and class based segments (CBS) as described in above-mentioned U.S. application Ser. No. 12/191,579. LLS generally segments the image into small patches where class labels or the color values of all the pixels within the same region are the same. This value that represents the region, can be the label of the corresponding cluster of pixels. Alternatively, the pixels can take the value of the cluster center (as in the Kmeans approach), or as in Mean Shift, where the individual labels/colors are converged the mode value (see D. Comaniciu, P. Meer: Mean shift: A robust approach toward feature space analysis, IEEE Trans. Pattern Anal. Machine Intell., 24, 603-619, 2002). FIG. 4 shows a) an example image with b) its low level segments (LLS) generated with MeanShift (but labeled with a distinct region identifier for better visualization), and c) high level (CBS) segments generated from class probability maps. In the case of CBS, the labels correspond to Buildings (1), Persons (2), Rock (3), Sand (4), Sky (5), Snow (6), Roads (7), Vegetation (8), Vehicles (9), Water (10) and Undefined (11). It is to be appreciated that FIGS. 4-7 are only line drawing approximations to illustrate how the method works and are not intended to be representative of actual results.

For adding objects, a set of labeled object masks containing birds, cars, persons, airplanes, boats (about 30) were collected from the LabelMe and Pascal2007 databases. For each mask, the original image, the mask, its class label and also a list of background classes in which it is reasonable to insert the object are stored. In this way, a car will be associated with UrbanStructure, a flying bird or a plane with Sky, a walking person with UrbanStructure or Sand, a boat or a swimming duck with Water etc.

The prototype system repeats the following steps three times (for inserting three modifications):

1 Select a class label (from 1 to 10, or from those represented in the image) and list all objects that can be added in such a region. E.g., if the label is Sky (5) the object set includes airplanes and birds. If the label is not present in the image (in CBS) or there are no objects in the mask database that are related to that class (e.g., in our case Person or Vehicle), then another class label is selected until an eligible label is found.

2 Select one of the connected components randomly in the CBS that corresponds to the selected label (lab) and verify that the selected object can be inserted in the region. If not, resize the object and its mask.

3 Check if the region intersects previous modifications. If not, insert the object. Otherwise, go back to step 1 with another class label. If there are no more class labels available, then consider another type of modification which is feasible.

Figure 5A:
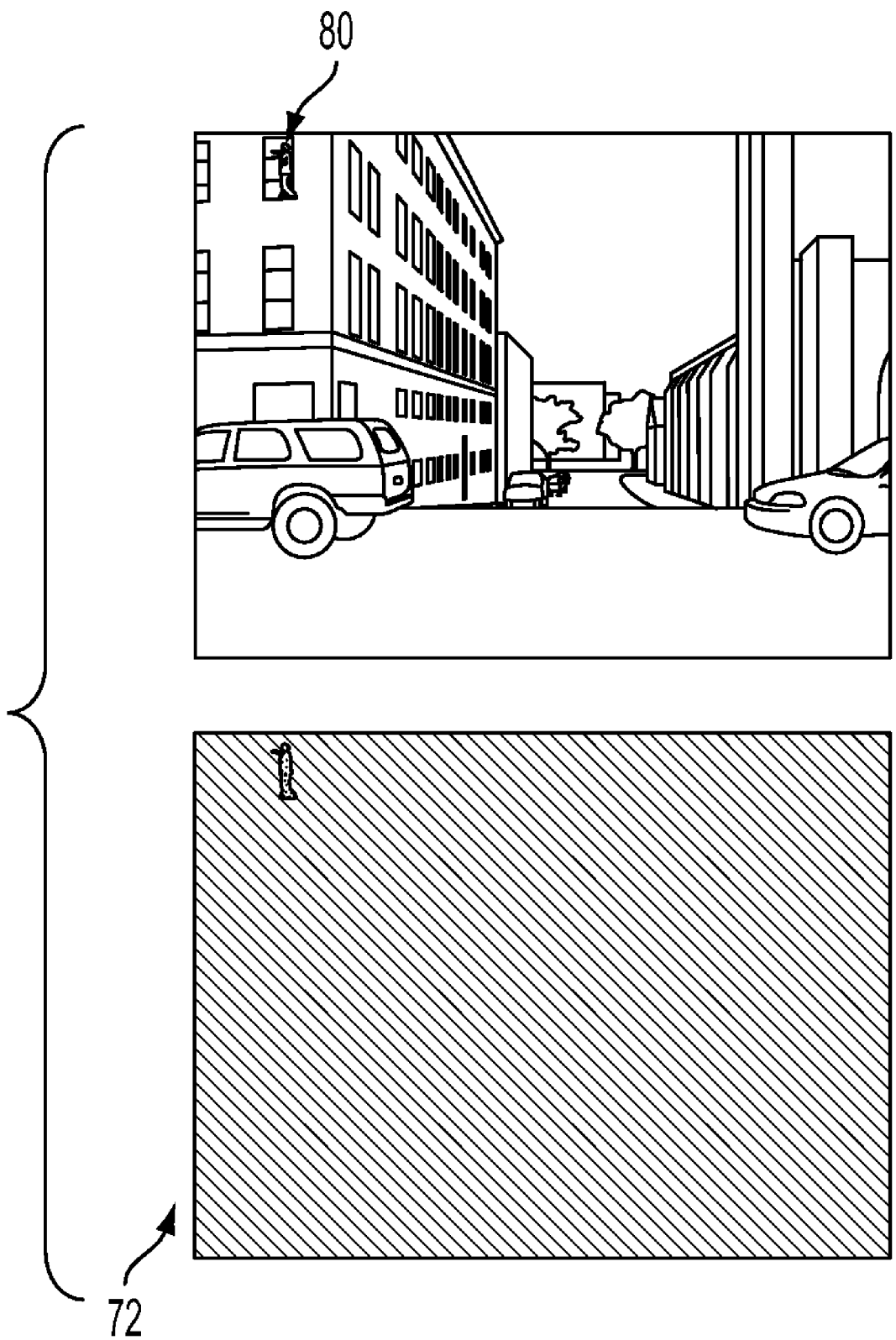
FIG. 5 illustrates stepwise introduction of modifications by incorporating objects in compatible regions and creation of a Modifications Memory Map (MMM)
Figure 5B:
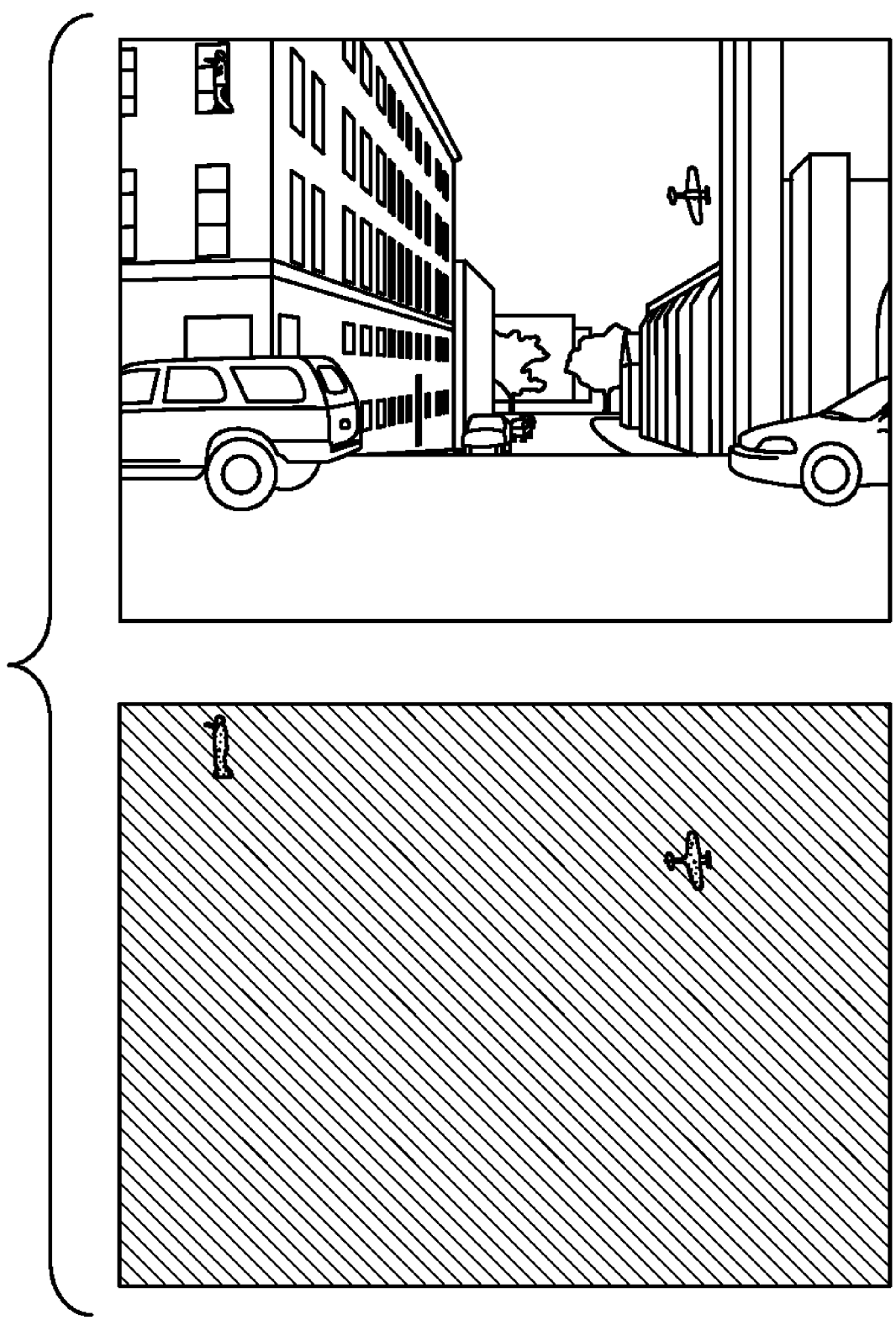
Figure 5C:
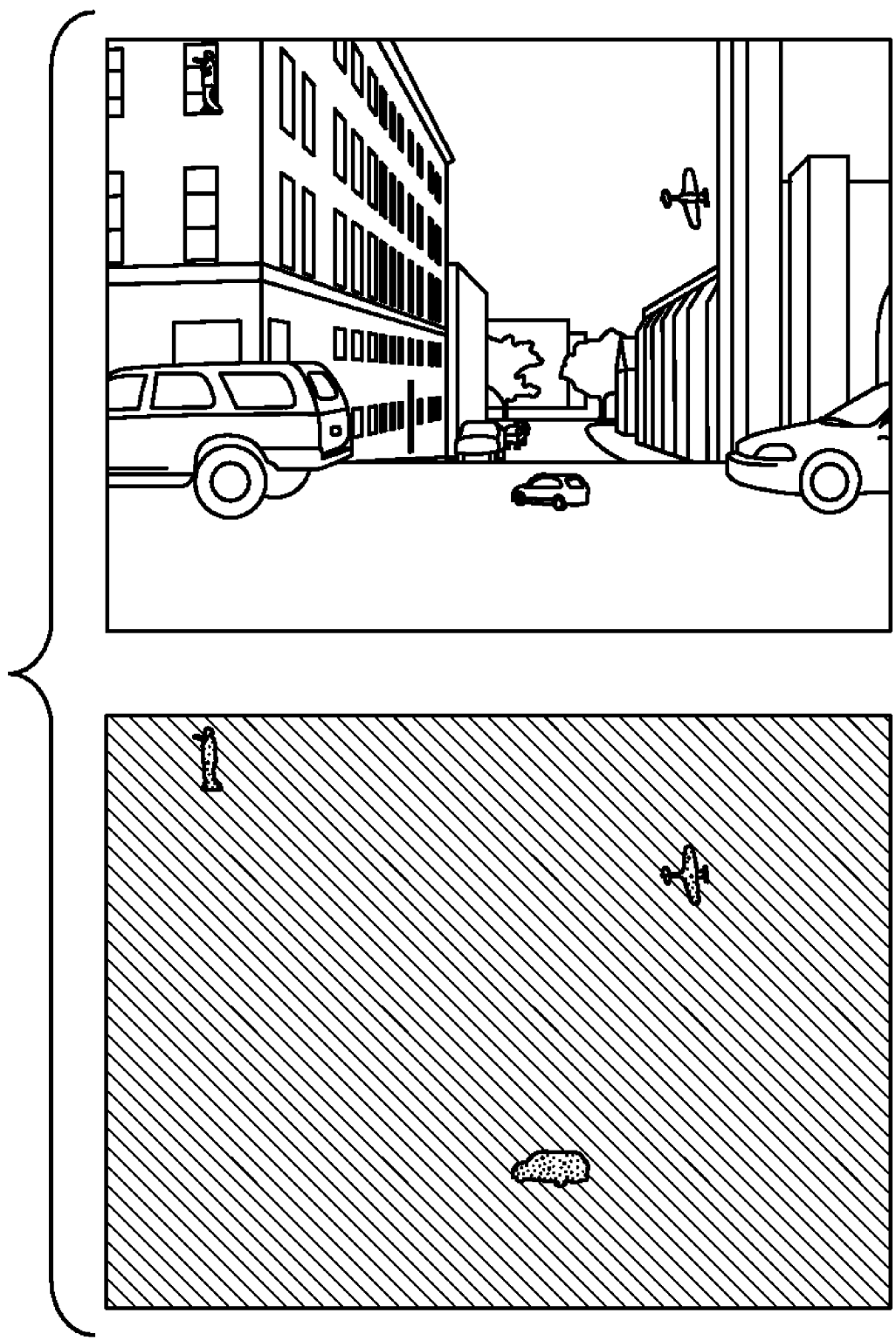

FIG. 5 shows how the image in FIG. 4 and the Modifications Memory Map (MMM) is changing at each step. Three objects were automatically added from the masks database to the image and the MMM mask updated consequently.

Figure 6A:
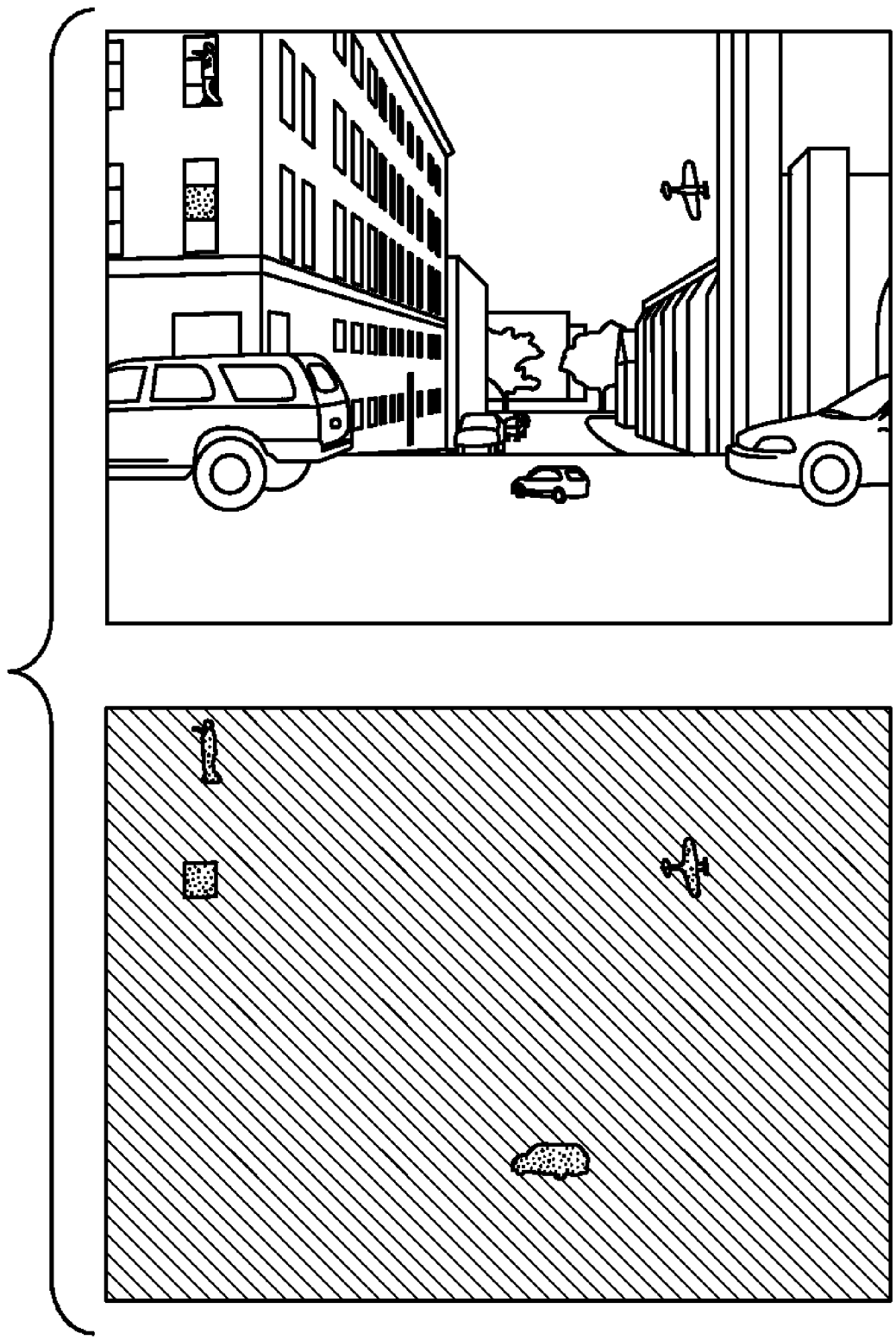
FIG. 6 illustrates stepwise introduction of modifications by color changes to objects and updating of the Modifications Memory Map.
Figure 6B:
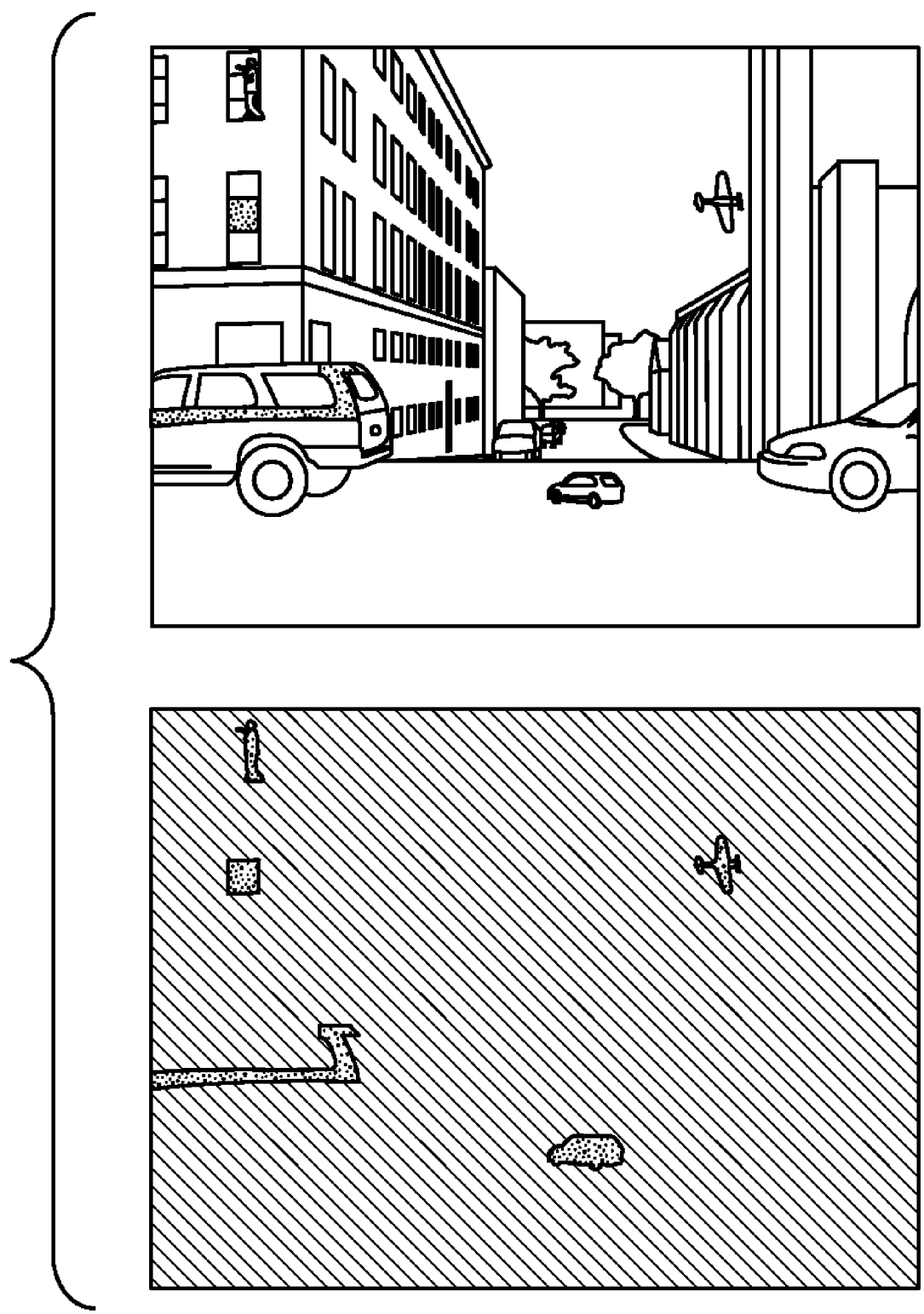
Figure 6C:
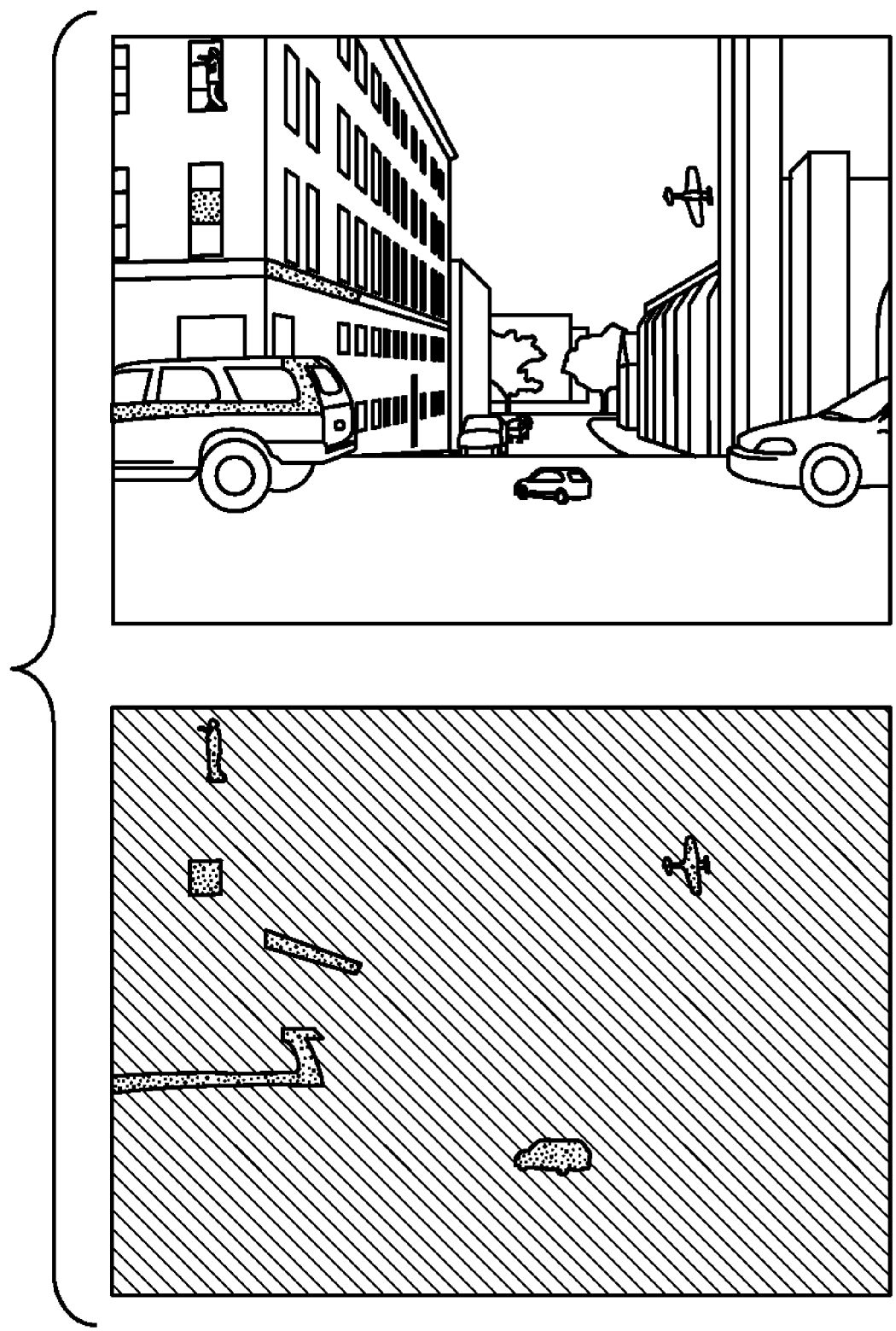

At the second stage, the prototype system chooses to modify the color appearance of three further random regions, by modifying the exposure, the saturation, making a color change, or combination thereof, as illustrated in FIG. 6. The system randomly chooses one of these modifications. The regions this time are obtained from low level segmentation (LLS). For this step, the method proceeds as follows:

1 Select a low level segmented region satisfying the following constraints:
   a) It has no intersection with the masked regions in the MMM.
   b) Its size is within a minimal and a maximal size (computed as a percentage of the image size). If it is too small the modification is unnoticeable, if it is too big, then the modification becomes too obvious.

2 Select a color modification (color change, saturation change, exposure change) randomly and apply. For example, the color modification direction can be automatically selected as a function of the mean value of the region (e.g. if dark make lighter, if low saturation increase, etc. . . . ).

As shown in FIG. 6, the three color modifications implemented by the system are sequentially applied to the photographic image and the MMM map updated to identify their locations.

Figure 7:
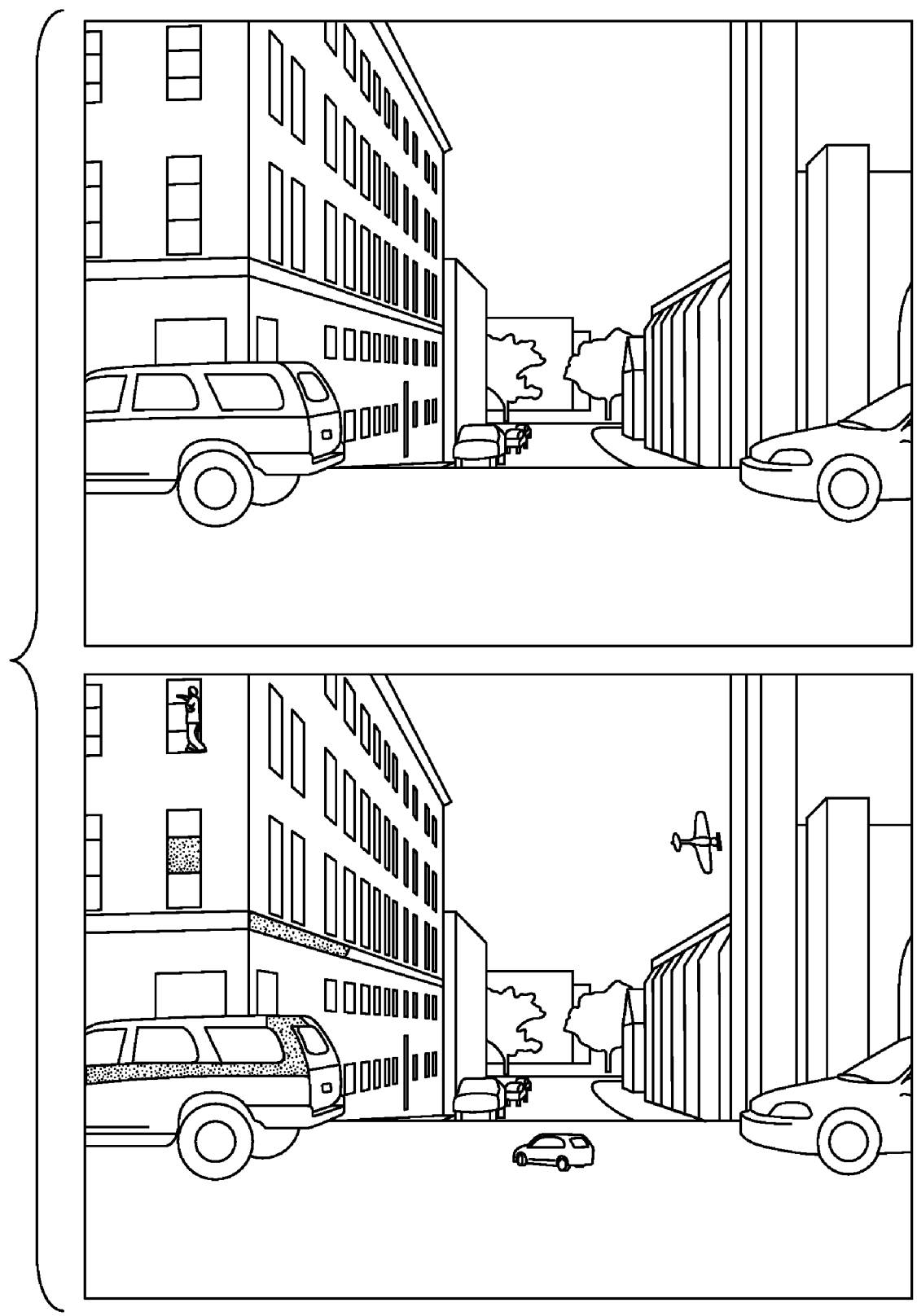
FIG. 7 illustrates a pair of spot the difference images developed by the exemplary method.

FIG. 7 shows the final spot-the-difference pair of photographic images. Obviously as the above examples show, the prototype system can be refined to produce more difficult to spot differences, for example, by better categorization of the regions, a better understanding of the image and its elements, such as image depth, orientation and size of a vehicle compared to other objects, etc. For example, the class-based segmentation approach can be used. Furthermore to obtain more photo-realistic modifications, alpha-blending (or any other blending method) can be used with insertion or deletion of objects.

As previously noted, the presented system can also be improved by allowing the user to influence the creation process in a semi-automated system, e.g., by allowing the user to view each modification and accept, reject, or further modify it before proceeding to the next modification. The user does not have to worry about choosing the modification and does not need specific photofinishing skills. The corresponding Modifications Memory Map (MMM) can be modified accordingly.

The exemplary system has several advantages over the fully manual approach to creating spot-the-difference image pairs. With a fully manual approach, creating a pair of spot-the-difference images can be a long and painful task for several reasons: The choice of the modifications to apply: What are the parts in the images that could be good for a modification? What type of local modification could be done (insertion, color change, stretching, etc.)? In the case of insertion, what would be a good object to insert? All these questions require several minutes for many users. This is particularly difficult because often several answers are possible. In addition, for non-specialists, it is difficult to know the available tools to do a modification. Clearly, providing a tool that focuses the user's attention on only "good" modifications choices (in the case of semi-automatic and interactive systems) there is a considerable saving of time.

Further, the insertion of the modifications requires advanced photofinishing skills to make them appear natural.

As will be appreciated, in the semi-automated/interactive systems disclosed herein, the user viewing the modifications would not be an ultimate player of a game in which image pairs generated by the exemplary method are displayed to the player (digitally or in hard copy). The fully automatic system has advantages in that a single user (e.g. a child) can directly play the game on the images he likes. Indeed with such a system, he can select his favorite image and automatically receives the pair of images to play the game with. As previously noted, in such a case the photorealism is not necessarily the main goal.

The exemplary system and method enables automatic creation of spot-the-difference (and other spare-time) activities from arbitrary images, generally photographs. Photographers are making increasing use of photofinishing services for printing of their images, and the spot-the-difference option provides an additional product for such services to provide to customers, along with conventional printing. The spot the differences images can be presented side by side in book format using photo-book making tools currently employed by such services and personalized, e.g., with the user's name, title, or the like on the front cover.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implemented method of generating a game comprising:
   receiving a user-selected original image;
   storing the image in memory;
   from the original image, automatically generating a pair of images which are visually identical except for a predetermined number of random localized modifications, the game being played by spotting differences between the pair of images as a result of the modifications; and
   providing the pair of images to the user as a game;
   wherein at least one of the localized modifications includes insertion of an object and the method comprises:
      automatically classifying each of a plurality of regions of the image into a respective class for the region; and
      accessing a library of objects which are each indexed according to the region classes with which the object is compatible and, for at least one of the classified regions, randomly selecting an object that is compatible with the region and applying the object to the region.

2. The method of claim 1, wherein the original image is a photograph.

3. The method of claim 1, wherein the original image is received from a user by server computer which interacts with the user via a web browser on the user's computing device.

4. The method of claim 1, further comprising printing the pair of images.

5. The method of claim 1, wherein the localized modifications are selected from the group consisting of:
   a). rigid/geometric transformations;
   b). non-rigid transformations;
   c). insertion of an object;
   d). delete of an object;
   e). change of appearance of an object;
   f). replacement of an object; and combinations thereof.

6. The method of claim 1, wherein the localized modifications are applied sequentially to the original image.

7. The method of claim 6, wherein each sequential modification is stored as a mask on a modifications memory map.

8. The method of claim 1, wherein the localized modifications are applied as a group to the original image, the method comprising, selecting from a set of possible modifications a subset of candidate modifications comprising the predetermined number of non-overlapping modifications and optionally scoring the subset of candidate modifications against criteria which are expected to affect the difficulty of the resulting game to identify the group of localized modifications.

9. The method of claim 1, further comprising:
   presenting the localized modifications to the user for validation prior to providing the pair of images to the user as a game.

10. The method of claim 9, further comprising:
    providing for the user to modify the localized modifications prior to validation.

11. The method of claim 1, further comprising storing each sequential modification as a mask on a modifications memory map.

12. The method of claim 1, wherein the number of modifications is at least three.

13. The method of claim 1, wherein the number of modifications is up to ten.

14. The method of claim 1, wherein the user is provided with the number of the modifications.

15. The method of claim 1, further comprising interacting with the user via a web browser, whereby the original image is selected and the pair of images are displayed.

16. A system for generating a game comprising:
instructions stored in memory comprising:
  an image modification component comprising instructions which prompt a user to select an original image from an album of the user and, from the original image, automatically generates a pair of images which are otherwise identical except for a predetermined number of localized modifications, the game being played by spotting differences between the pair of images; and
  a classification component which assigns classes to each of a plurality of regions of the original image;
  the image modification component providing for insertion of an object as a localized modification and wherein when at least one of the localized modifications includes insertion of an object, the image modification component selecting an object from an associated library of objects, each of the objects being indexed according to the region classes with which the object is compatible and, for at least one of the classified regions, the selecting of the object comprises automatically selecting an object that is compatible with the one of the classified regions and applying the object to the region; and
a processor communicatively linked to the memory which executes the instructions and outputs the pair of images to the user as a game.

17. The system of claim 16, further comprising a database, linked to the processor, which stores the user's album.

18. The system of claim 16, further comprising a library communicatively linked to the processor which stores a set of isolated objects suited to being applied to the original image for creating one of the localized modifications.

19. A method of playing a game comprising:
providing for a user to select an original image from the user's album;
from the original image, automatically generating a pair of images which are otherwise identical except for a predetermined number of localized modifications;
providing for at least one of the localized modifications to include insertion of an object;
outputting the pair of images; and
playing a game with the pair of images by spotting differences between the pair of images;
wherein for at least one of the localized modifications that includes insertion of an object, the method comprising:
  automatically classifying each of a plurality of regions of the image into a respective class for the region; and
  accessing a library of objects which are each indexed according to the region classes with which the object is compatible and, for at least one of the classified regions, selecting an object from the library that is compatible with the region and applying the object to the region.

20. A system for performing the method of claim 19 comprising memory which stores instructions for performing the method and a processor in communication with the memory, which executes the instructions.

21. A computer program product comprising a non-transitory storage medium encoding instructions, which when executed on a computer causes the computer to perform the method of claim 19.

22. A system for performing the method of claim 1 comprising memory which stores instructions for performing the method and a processor in communication with the memory, which executes the instructions.

23. A computer program product comprising a non-transitory storage medium encoding instructions, which when executed on a computer causes the computer to perform the method of claim 1.

* * * * *